US009529759B1

(12) United States Patent
Hart et al.

(10) Patent No.: US 9,529,759 B1
(45) Date of Patent: Dec. 27, 2016

(54) MULTIPATH I/O IN A COMPUTER SYSTEM

(71) Applicant: International Business Machines Corporation, Armonk, NY (US)

(72) Inventors: Brian W. Hart, Austin, TX (US); Anil Kalavakolanu, Austin, TX (US); James A. Pafumi, Leander, TX (US); Vani D. Ramagiri, Austin, TX (US); Evelyn T. Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/995,982

(22) Filed: Jan. 14, 2016

(51) Int. Cl.
*G06F 13/38* (2006.01)
*G06F 13/40* (2006.01)
*G06F 13/42* (2006.01)
*G06F 13/28* (2006.01)

(52) U.S. Cl.
CPC ........... *G06F 13/4022* (2013.01); *G06F 13/28* (2013.01); *G06F 13/385* (2013.01); *G06F 13/4234* (2013.01)

(58) Field of Classification Search
CPC .. G06F 13/4022; G06F 13/28; G06F 13/4234; G06F 13/385
See application file for complete search history.

(56) References Cited

U.S. PATENT DOCUMENTS

| 6,230,219 B1 | 5/2001 | Fields, Jr. et al. |
| 8,244,934 B2 | 8/2012 | Veni et al. |
| 9,021,232 B2 | 4/2015 | Kopylovitz et al. |
| 2003/0159001 A1* | 8/2003 | Chalmer ............... G06F 3/0601 711/120 |
| 2005/0080940 A1* | 4/2005 | Flynn .................... G06F 3/0607 710/15 |
| 2005/0223127 A1* | 10/2005 | Boutcher ............... G06F 13/28 710/22 |

(Continued)

FOREIGN PATENT DOCUMENTS

GB    2388223 A1    11/2003

OTHER PUBLICATIONS

"Microprocessor Assisted Channel Interface Controller for a Multipath Channel to Channel Adapter" by Hopko et al., Dec. 1, 1981.*

(Continued)

*Primary Examiner* — Jing-Yih Shyu
(74) *Attorney, Agent, or Firm* — Brandon C. Kennedy; Grant A. Johnson; Kennedy Lenart Spraggins LLP

(57) ABSTRACT

Multipath I/O in a computer system includes: receiving asynchronously, for a single I/O operation by a memory controller from a plurality of I/O adapters, a request to access a memory page, where each request to access the memory page includes an adapter-specific tag; and for each request received by the memory controller: determining, by the memory controller, whether an adapter-specific tag has been assigned to the memory page; if an adapter-specific tag has not been assigned to the memory page: assigning, by the memory controller, the received adapter-specific tag to the memory page; and allowing, by the memory controller, access to the memory page; and if an adapter-specific tag has been assigned to the memory page, granting access to the memory page only when the received adapter-specific tag is the adapter-specific tag assigned to the memory page.

11 Claims, 4 Drawing Sheets

(56) References Cited

U.S. PATENT DOCUMENTS

| | | | | |
|---|---|---|---|---|
| 2006/0268913 | A1* | 11/2006 | Singh | H04L 49/90 370/412 |
| 2007/0260768 | A1* | 11/2007 | Bender | G06F 12/1081 710/22 |
| 2009/0210574 | A1* | 8/2009 | Fleming | G06F 11/0757 710/19 |
| 2009/0235110 | A1 | 9/2009 | Kurokawa | |
| 2011/0314182 | A1* | 12/2011 | Muppirala | G06F 13/00 710/5 |
| 2011/0320666 | A1* | 12/2011 | Gregg | G06F 13/4027 710/300 |
| 2013/0054840 | A1* | 2/2013 | Sarcone | G06F 13/00 710/5 |
| 2015/0067253 | A1* | 3/2015 | Madhusudana | G06F 3/0659 711/114 |
| 2015/0095445 | A1 | 4/2015 | Thankappan et al. | |

OTHER PUBLICATIONS

Appendix P; List of IBM Patent or Applications Treated as Related, Feb. 24, 2016, 2 pages.

Suzuki et al., "Multi-Root Share of Single-Root I/O Virtualization (SR-IOV) Compliant PCI Express Device", 18$^{th}$ IEEE Symposium on High Performance Interconnects (HOTI), Aug. 2010, pp. 25-31, IEEE Xplore Digital Library, DOI: 10.1109/HOTI.2010.21.

* cited by examiner

MULTIPATH I/O IN A COMPUTER SYSTEM

BACKGROUND OF THE INVENTION

Field of the Invention

The field of the invention is data processing, or, more specifically, methods, apparatus, and products for multipath I/O in a computer system.

Description of Related Art

Many computer systems allow multiple physical paths between a host and attached I/O (input/output) devices, such as storage devices. For example, a disk storage device may be accessible to a host via either of a pair of Fibre Channel adapters. In another example, a virtual disk storage device may be accessible via either of a pair of virtual I/O servers.

When issuing an I/O request, a host in such a multipath environment may consider the set of paths available and choose a single path to service the I/O request. The host may take into account various attributes of the paths when selecting the path to service the I/O request. Such attributes may include, for example, a number of I/O requests currently outstanding for each path, recent I/O response times of each path, recent I/O failures of each path, and the like.

Even with consideration of such attributes however, a host is still exposed to the possibility that an I/O request issued to a 'best expected' path may be delayed. For example, a spike in activity on a Fibre Channel adapter or in a virtual I/O server may cause a delay in initiating an I/O request. Some other problem in the adapter of virtual I/O server may cause the I/O to fail entirely, but in a way that is detected only after a lengthy time period.

In cases where an I/O request along one path fails after a delay, the host may recover by retrying the I/O request along a second path. Such a "retry after delayed failure" can extend the service time of an I/O request by several orders of magnitude.

SUMMARY

Methods, apparatus, and products for multipath I/O in a computer system are disclosed in this specification. Such multipath I/O includes: receiving asynchronously, for a single I/O operation by a memory controller from a plurality of I/O adapters, a request to access a memory page, where each request to access the memory page includes an adapter-specific tag; and for each request received by the memory controller: determining, by the memory controller, whether an adapter-specific tag has been assigned to the memory page. If an adapter-specific tag has not been assigned to the memory page, the memory controller assigns the received adapter-specific tag to the memory page and allows access to the memory page. If an adapter-specific tag has been assigned to the memory page, the memory controller grants access to the memory page only when the received adapter-specific tag is the adapter-specific tag assigned to the memory page.

The foregoing and other features will be apparent from the following descriptions of example embodiments as illustrated in the accompanying drawings wherein like reference numbers generally represent like parts of exemplary embodiments.

DETAILED DESCRIPTION OF EXAMPLE EMBODIMENTS

Example methods, apparatus, and products for multipath I/O in a computer system in accordance with the present invention are described with reference to the accompanying drawings, beginning with FIG. 1. The term 'multipath' as used in this specification refers to a data communications paths formed by a plurality of I/O adapters to a single I/O device coupled to the I/O adapter. Consider, for example, a single Peripheral Communications Interconnect (PCI) device, such as a storage device, coupled independently to two separate PCI adapters. A host (a host operating system), may utilize either PCI adapter as a communications path for I/O to and from the single PCI device. Such a communications topology is referred to in this specification as 'multipath.' Readers of skill in the art will recognize that many different types of I/O adapters may be implemented to form such a multipath I/O topology. Examples of such I/O adapters include PCI adapters, PCIe ('PCI express') adapters, Fibre Channel adapters and the like.

Figure 1:
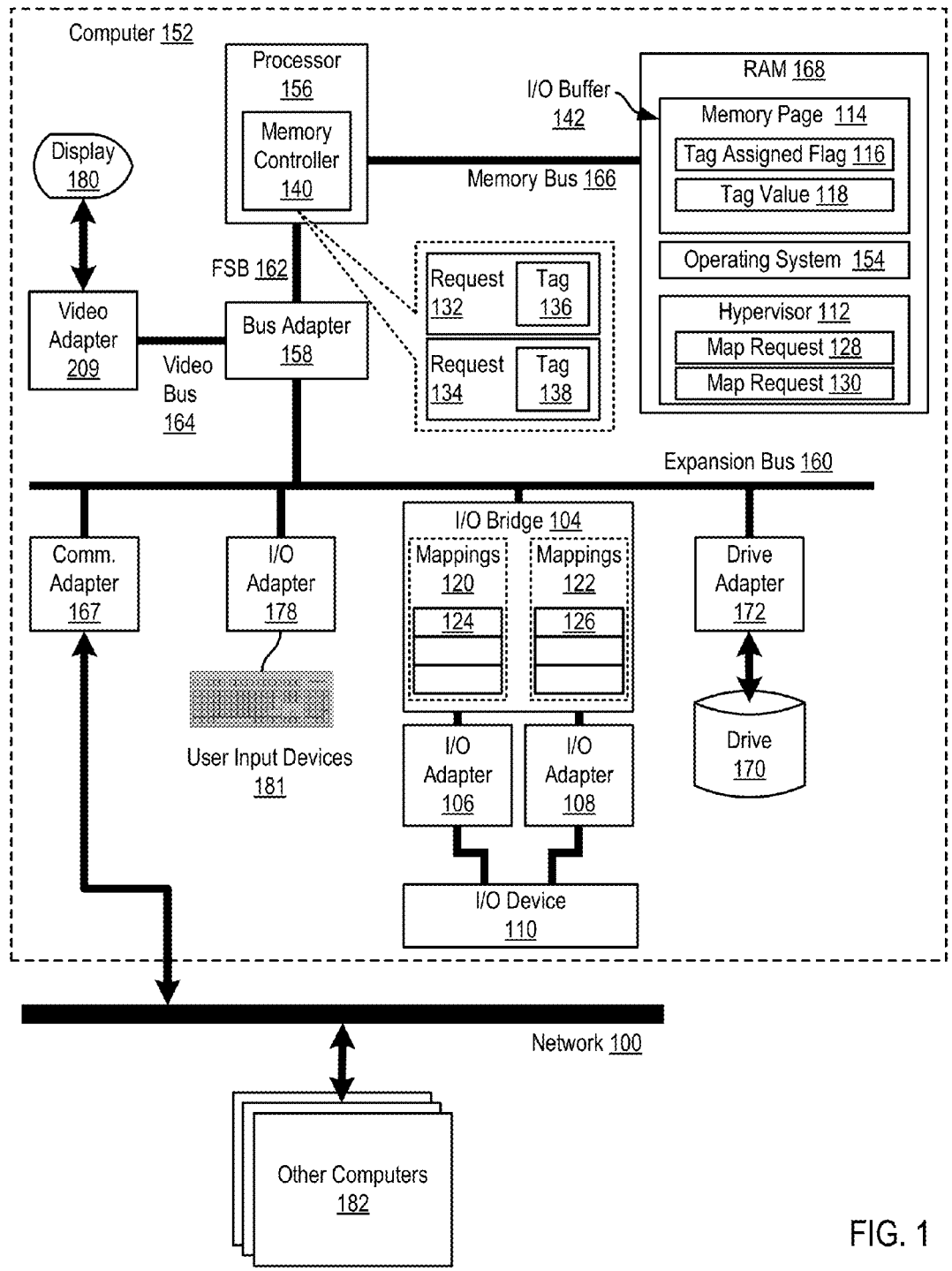
FIG. 1 sets forth a block diagram of a system configured for multipath I/O according to embodiments of the present invention.

FIG. 1 sets forth a block diagram of a system configured for multipath I/O according to embodiments of the present invention. The system of FIG. 1 includes an example computer (152) configured for multipath I/O according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a hypervisor (112). A hypervisor, or virtual machine monitor (VMM), is a module of computer program instructions, firmware or hardware that administers the operation of virtual machines. A computer on which a hypervisor is running one or more virtual machines is defined as a host machine. Each virtual machine may be called a guest machine. The hypervisor presents guest operating systems within a guest machine with a virtual operating platform and manages the execution of the guest operating systems. Multiple instances of a variety of operating systems may share the virtualized hardware resources.

Also stored RAM (168) is an operating system (154). Operating systems useful in computers configured for multipath I/O according to embodiments of the present invention include UNIX™, Linux™, Microsoft Windows™, AIX™, IBM's i™, and others as will occur to those of skill in the art. The operating system (154) and hypervisor (112) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for multipath I/O according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 also includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for multipath I/O according to embodiments of the present invention include modems for wired dial-up communications, Ethernet (IEEE 802.3) adapters for wired data communications, and 802.11 adapters for wireless data communications.

The example computer (152) of FIG. 1 includes a video adapter (209), which is an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes one or more other input/output ('I/O') adapters (178, 106, 108). I/O adapters, such as I/O adapter (178), may implement user-oriented input/output through, for example, software drivers and computer hardware for controlling output to display devices such as computer display screens, as well as user input from user input devices (181) such as keyboards and mice. Other I/O adapters, such as I/O adapter (106, 108), may be provide I/O communications to one or more I/O devices (110). Such I/O devices may be a storage device, a communications adapter, a video adapter, and so on as will occur to readers of skill in the art.

In the example of FIG. 1, two of the three depicted I/O adapters (106, 108) are independently coupled to the I/O device (110). That is, the I/O adapters (106, 108) provide multiple I/O paths from a host (such as the operating system (154)) to the I/O device through use of a memory controller (140) and I/O bridge (104).

An I/O bridge as the term is used in this specification refers to a module of automated computing machinery that enables multiple independent I/O buses to be coupled to one another. The PCI standard, for example, permits multiple independent PCI buses to be connected by bus bridges that will forward operations on one bus to another.

The I/O adapters (106, 108), hypervisor, host operating system (154), and memory controller (140) may operate according to embodiments of the present disclosure to provide multipath I/O. To that end, either of the host operating system (154) or the hypervisor may initialize one or more memory pages (114) in RAM (168) to be utilized as a buffer (142) for I/O. Such a buffer may be accessible in various ways including, for example, through direct memory access (DMA) operations. Such an initialization of a memory page (114) may include initialization a 'tag state' of the memory page.

A 'tag state' as the term is used in this specification refers to the state of one or more values associated with adapter-specific tags assigned to memory pages at various times. An adapter-specific 'tag' refers to an identifier of an I/O adapter. Each memory page used as an I/O buffer (142) may include a 'tag assigned flag' (116) that indicates whether an adapter-specific tag has been assigned to the memory page and the memory page may also include data representing a 'tag value' (118)—an adapter-specific tag—if one has been assigned to that memory page. Initializing the tag state of such a memory page, therefore, may include clearing the tag assigned flag and the tag value in the memory page. Readers will understand that, while the tag assigned flag and tag value are described here as being included in the memory page itself, such an implementation is only one example among many possible example implementations. As another example, a data structure separate and independent from any memory pages may include an array of tag states for various memory pages. Each element of that array may include or be indexed by a pointer to a memory page, a tag value and a tag assigned flag.

Clearing the tag state of a memory page (114) may be carried out at different points in time. In some embodiments, the tag state of a memory page may be initialized responsive to the host operating system sending to a hypervisor an instruction to carry out an I/O operation in a multipath format. In other examples, any major change in—the system—booting into the operating, a recovery from an error, a modification of hardware, a hot-swap of an I/O device, and so on—may prompt the hypervisor or host to clear the tag state of the memory page. Although only a single memory page (114) is depicted in the example of FIG. 1, readers will understand that many memory pages may be created and utilized as an I/O buffer at any given time.

To effect a single I/O operation utilizing multipath I/O techniques, the host operating system (154) may issue to the hypervisor (112), for each of the I/O adapters (106,108), a request (128,130) to map the memory page. The host, for example, may provide the following example instructions to the hypervisor:

a. MAP (adap 1, 0xAAAA, 0x1234, Dup1)
b. MAP (adap 2, 0xBBBB, 0x1234, Dup2)

Each instruction includes an adapter identification ('adap 1' and 'adap 2'), a virtual memory address (0xAAAA and 0xBBBB), the physical memory address of the memory page to be mapped (0x1234) and an indication that the mapping request is a duplicate (Dup1 and Dup2). The indication that the mapping request is a duplicate may also be an adapter-specific tag. In other embodiments, the hypervisor, in completing the mapping instruction may generate an adapter-specific tag (a unique value assigned to each adapter).

The hypervisor, to carry out the mapping requests, may be configured to program the I/O bridge (104) with adapter-specific mappings (120, 122). The I/O bridge (104) in the example of FIG. 1 may include memory (non-volatile Flash memory or the like) that includes one or more arrays (120, 122) of mappings. Each mapping includes, at a minimum, an association of a virtual address that may be requested by a host I/O adapter as a parameter of an I/O operation and a physical memory address of an I/O buffer (142) in memory to utilize to effect such an I/O operation. In the example of FIG. 1, the I/O bridge includes an array (120) of mappings for I/O adapter (106) and an array (122) of mappings for I/O adapter (108).

The adapter-specific mappings (120, 122) programmed by the hypervisor into the I/O bridge to effect multipath I/O according to the present disclosure may include an association of the address of the memory page to utilize as an I/O buffer (0x1234 in the example above), an adapter-specific virtual memory address and an adapter-specific tag. Consider, for example that the hypervisor generates for adapter (106) an adapter-specific tag of '1' and for adapter (108) an adapter-specific tag of '2.' In such an embodiment, the hypervisor may program the I/O bridge (104) with a mapping (124) for I/O adapter (106) that includes 0xAAAA, 0x1234, 1 and with a mapping (126) for I/O adapter (108) that includes 0xBBBB, 0x1234, 2.

Such mappings may be implemented in a variety of manners. In some embodiments, for example, the I/O bridge is a PCI bridge and the arrays (120, 122) of adapter-specific mappings may be implemented as translation control entry (TCE) arrays. Each entry in such an array may be implemented as a bit string with a portion of the bits dedicated to representing the virtual address, a portion of the bits dedicated to representing the physical address of the memory page, and a portion of the bits dedicated to representing the adapter-specific tag.

At a time after the hypervisor (112) programs the I/O bridge (104) with the adapter-specific mappings, the host operating system (154) may then issue, to each of the I/O adapters a request to access the memory page. The host may issue such requests through the I/O bridge as an I/O operation. Each request may essentially be the same I/O operation with the only difference being the virtual address. That is, each request may be issued utilizing the virtual memory programmed into the I/O bridge (104) as the adapter-specific mappings. For I/O adapter (106), for example, the host may issue a first I/O operation utilizing virtual address 0xAAAA and for I/O adapter (108), the host may issue a second I/O operation utilizing virtual address 0xBBBB. Each of the I/O operations may be issued in parallel.

Each adapter, responsive to receiving the I/O request may send a request (132, 134) to the memory controller for access to the memory page utilizing the physical address in the adapter-specific mapping programmed into the I/O bridge along with the adapter-specific tag (136, 138). The requests will be sent from an adapter to the memory controller in an asynchronous fashion. That is, one I/O adapter will send a request to access the memory page prior to another I/O adapter. Continuing with the example above, I/O adapter (106) may send a request to access the memory page 0xAAAA which is mapped by the I/O bridge (104) to 0x1234 along with the adapter-specific tag '1.' This may take place prior to the I/O adapter (108) sending a similar request to which accesses the memory page at 0x1234 along with the adapter-specific tag '2'.

The memory controller (140), for each request received, may determine whether an adapter-specific tag has been assigned to the memory page. On a first access request to the memory page no adapter-specific tag is set. Instead, the tag state is an initialized state. That is, the tag assigned flag (116) is clear (set to 'False') and the tag value (118) is clear (set to a 'null' value, for example).

If an adapter-specific tag has not been assigned to the memory page, the memory controller assigns the adapter-specific tag received in the request to the memory page. Such assignment may include storing the value of the adapter-specific tag as the tag value (118) and setting the tag assigned flag (to 'True', for example). Additionally, the memory controller allows access to the memory page. At this point, the I/O adapter may utilize the memory page as an I/O buffer and process the I/O operation. Upon completion of the I/O operation, the I/O adapter may provide a success notification to the host operating system (154) that issued the original I/O operation to the adapter.

Consider, for example, that I/O adapter (106) is the first I/O adapter to request access to the memory page (114) after the tag state of the memory page has been initialized. That is, the I/O adapter (106) essentially 'beats' I/O adapter (108) to the memory page. In such an embodiment, the memory controller upon determining that the tag assigned flag is clear and the tag value is empty, assigns the adapter-specific tag of '1' to the memory page and sets the tag assigned flag (116). Further, the memory controller permits access to the memory page (114) to adapter (106). Adapter (106) then continues to complete the I/O operation utilizing the memory page (114) as an I/O buffer.

If, however, an adapter-specific tag has been assigned to the memory page, the memory controller (140) grants access to the memory page only when the received adapter-specific tag is the adapter-specific tag assigned to the memory page. If, after being granted access to the memory page, I/O adapter (106) again requests access to the memory page utilizing adapter-specific tag '1', the memory controller will again grant access to the memory page.

If, however, after I/O adapter (106) first requests access to the memory page and is granted access, the I/O adapter (108) sends a request to access the memory page to the memory controller along with the adapter-specific tag '2', the memory controller will deny such access. In such an example, the memory controller may determine that a tag value has been set and the value is '1'. The memory controller will then determine that the adapter-specific tag value of I/O adapter (108) does not match the adapter-specific tag value assigned to the memory page (114). As such, the memory controller will deny access to the memory page to I/O adapter (108). In such an instance, the I/O adapter (108) will eventually return a failure notification to the host operating system (154) indicating that the I/O operation issued to the I/O adapter has not successfully completed.

In this way, the host operating system may provide duplicate I/O requests to multiple I/O adapters coupled to the same I/O device and whichever I/O adapter is able to begin the I/O operation first does so.

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
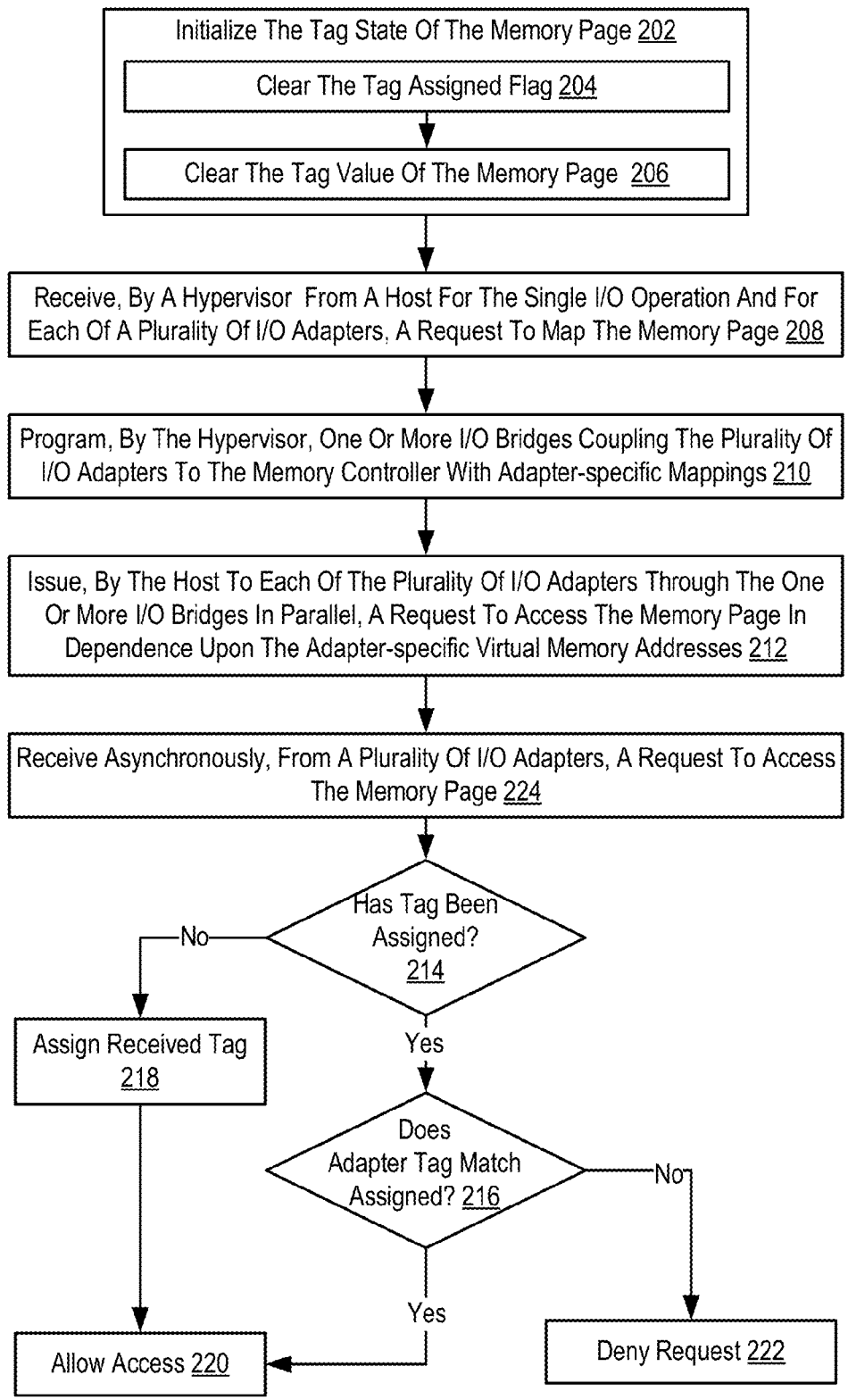
FIG. 2 sets forth a flow chart illustrating an exemplary method for multipath I/O in a computer system according to embodiments of the present invention.

For further explanation, FIG. 2 sets forth a flow chart illustrating an example method for multipath I/O in a computer system according to embodiments of the present invention. The method of FIG. 2 may be carried out in a computer system similar to that depicted in the example of FIG. 1. To that end, drawing elements from FIG. 1 may be referenced below with respect to FIG. 2.

The method of FIG. 2 includes initializing (202), by a hypervisor (112), adapter-specific tag information (116, 118) of a memory page (114). In the method of FIG. 2, initializing (202) adapter-specific tag information of a memory page includes clearing (204) a tag assigned flag (116) indicating whether an adapter-specific tag has been assigned to the memory page and clearing (206) a value (118) of an adapter-specific tag previously assigned to the memory page. Clearing (204) a tag assigned flag may include setting the tag assigned flag to a value of 'False.' Clearing (206) a value of an adapter-specific tag may include setting the value to 'Null' or some other predefined value such as 0.

The method of FIG. 2 also includes receiving (208), by the hypervisor (112) from a host (154) for a single I/O operation and for each of a plurality of I/O adapters (106, 108), a request to map the memory page. Receiving a request to map the memory page for each of a plurality of I/O adapters may include receiving multiple requests to map the memory page where each request includes an identifier of an I/O adapter, an adapter-specific virtual memory address, and an address of the memory page.

The method of FIG. 2 also includes programming (210), by the hypervisor (112), one or more I/O bridges (104) coupling the plurality of I/O adapters (106, 108) to a memory controller (140) with adapter-specific mappings (124, 126). Programming (210) one or more I/O bridges with adapter-specific mappings may include initially generating an adapter-specific tag for each of the I/O adapters and storing in memory of the I/O bridge, for each of the I/O adapters, an association of the memory page physical address, the adapter-specific tag, and the adapter-specific virtual memory address.

The method of FIG. 2 also includes issuing (212), by the host (154) to each of the plurality of I/O adapters (106, 108) through the one or more I/O bridges (104) in parallel, a request to access the memory page (114) in dependence upon the adapter-specific virtual memory addresses. Issuing (212) a request to access the memory page to each of the I/O adapters may include issuing an I/O operation to each of the I/O adapters that is identical but for the virtual memory address mapped to the memory page for each I/O adapter.

The method of FIG. 2 also includes receiving (224) asynchronously, by the memory controller from a plurality of I/O adapters, a request (132, 134) to access a memory page. Each request to access the memory page includes an adapter-specific tag (136, 138). For each request received by the memory controller, the method of FIG. 2 includes determining (214), by the memory controller, whether an adapter-specific tag has been assigned to the memory page. Determining whether an adapter-specific tag has been assigned to the memory page may be carried out by determining whether the tag assigned flag is set.

If an adapter-specific tag has not been assigned to the memory page, the method of FIG. 2 continues by assigning (218), by the memory controller, the received adapter-specific tag to the memory page and allowing (220), by the memory controller, access to the memory page. If, however, an adapter-specific tag has been assigned to the memory page, the method of FIG. 2 continues by determining (216) whether the adapter-specific tag received from the I/O adapter in the request to access the memory page is the adapter-specific tag assigned to the memory page. Such a determination may be carried out by comparing the adapter-specific tag received in the request to access the memory page to the value of the assigned adapter-specific tag stored in the memory page (or another data structure designated for such purpose). The method of FIG. 2 continues by granting access (220) to the memory page if the received adapter-specific tag is the adapter-specific tag assigned to the memory page and denying (222) access to the memory page otherwise.

Figure 3:
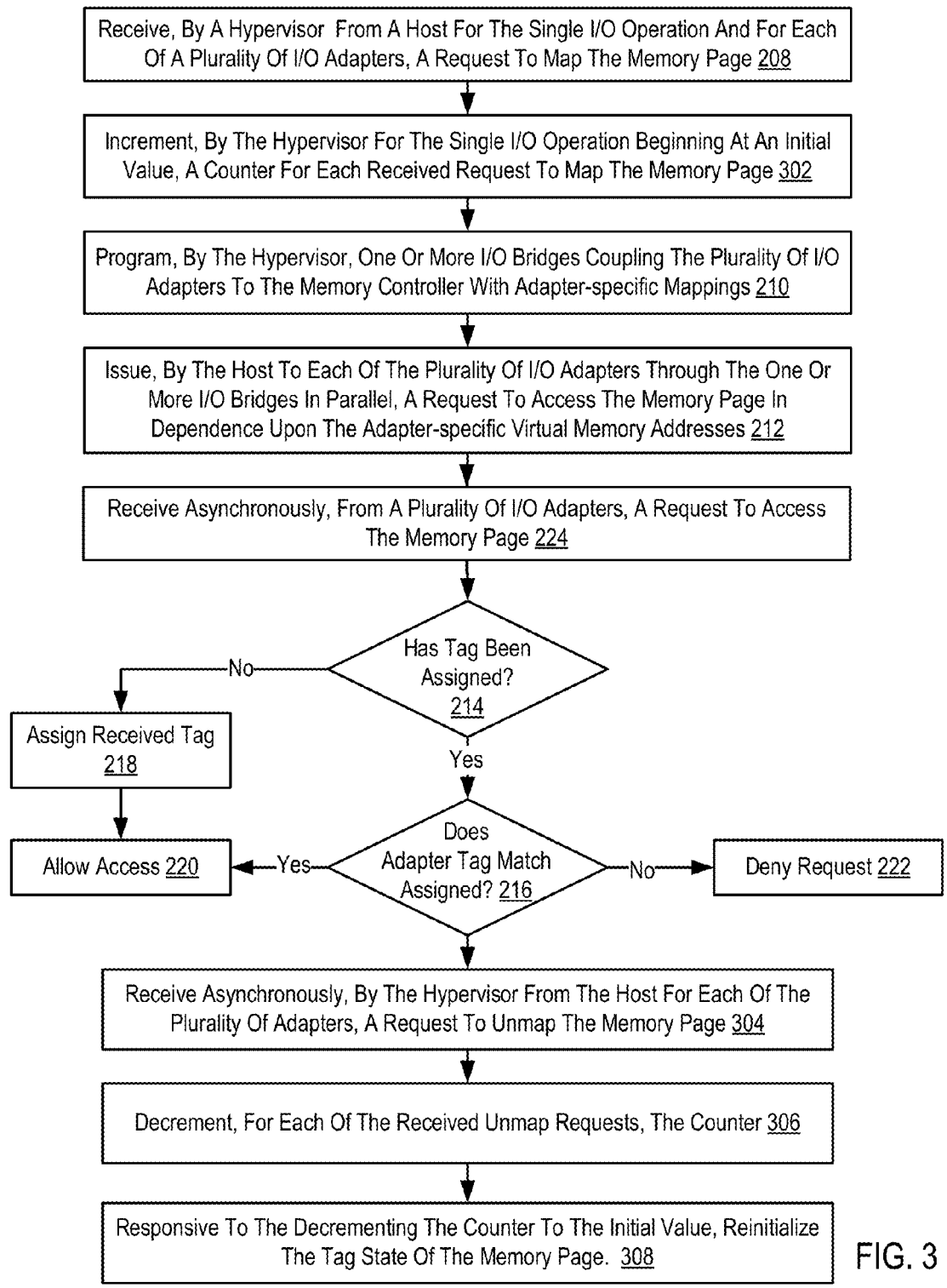
FIG. 3 sets forth a flow chart illustrating another example method for multipath I/O in a computer system according to embodiments of the present invention.

For further explanation, FIG. 3 sets forth a flow chart illustrating another example method for multipath I/O in a computer system according to embodiments of the present invention. The method of FIG. 3 is similar to the method of FIG. 2 in that the method of FIG. 3 may also be carried out in a computer system similar to that depicted in the example of FIG. 1. Further, the method of FIG. 3 also includes: receiving (208), for each of a plurality of I/O adapters, a request to map a memory page; programming (210) one or more I/O bridges with adapter-specific mappings; issuing (212) to each of the plurality of I/O adapters a request to access the memory page; receiving (224) asynchronously, from each I/O adapters, a request to access the memory page; for each request received by the memory controller: determining (214) whether an adapter-specific tag has been assigned to the memory page; if an adapter-specific tag has not been assigned to the memory page: assigning (218) the received adapter-specific tag to the memory page; and allowing (220) access to the memory page; and if an adapter-specific tag has been assigned to the memory page, granting access (220) to the memory page only when the received adapter-specific tag is the adapter-specific tag assigned to the memory page.

The method of FIG. 3 differs from the method of FIG. 2, however, in that the method of FIG. 3 includes incrementing (302), by the hypervisor, a counter from an initial value, for each received request to map the memory page. In some embodiments, the counter's initial value may be zero. Upon receiving a mapping request from the host, the hypervisor may increment the counter value.

After an I/O adapter completes an I/O request, either in success or failure, the I/O adapter may report the success or failure to the host. Then, responsive to receiving such a report, the host may send an 'unmap' instruction to the hypervisor instructing the hypervisor to remove the adapter-specific mapping programmed into the I/O bridge for the I/O adapter that initiated the completion report. Such unmap commands may be received at various times by the hypervisor depending upon the time at which the host receives the completion report from the I/O adapter. To that end, the method of FIG. 3 also includes receiving (304) asynchronously, by the hypervisor from the host for each of the plurality of adapters, a request to unmap the memory page and decrementing (306), for each of the received unmap requests, the counter. Consider, for example, that the host issues two initial mapping requests for a single I/O operation. The hypervisor in such an example may increment the counter once for each mapping request to a value of '2.' One I/O adapter completes, sends a completion report to the host which then sends an unmap request for that I/O adapter's mappings. The hypervisor, in addition to performing the unmap request, may then decrement the counter from 2 to 1. Finally, the last I/O adapter sends a completion report to the host, which then sends an unmap request for that I/O adapter's mappings. The hypervisor then decrements the counter to a value of 0.

Responsive to the decrementing the counter to the initial value, the method of FIG. 3 continues by reinitializing (308) the tag state of the memory page. That is, the hypervisor may clear the tag assigned value and the tag assigned flag in the memory page. The hypervisor may also perform other types of 'clean up' operations at this time.

Figure 4:
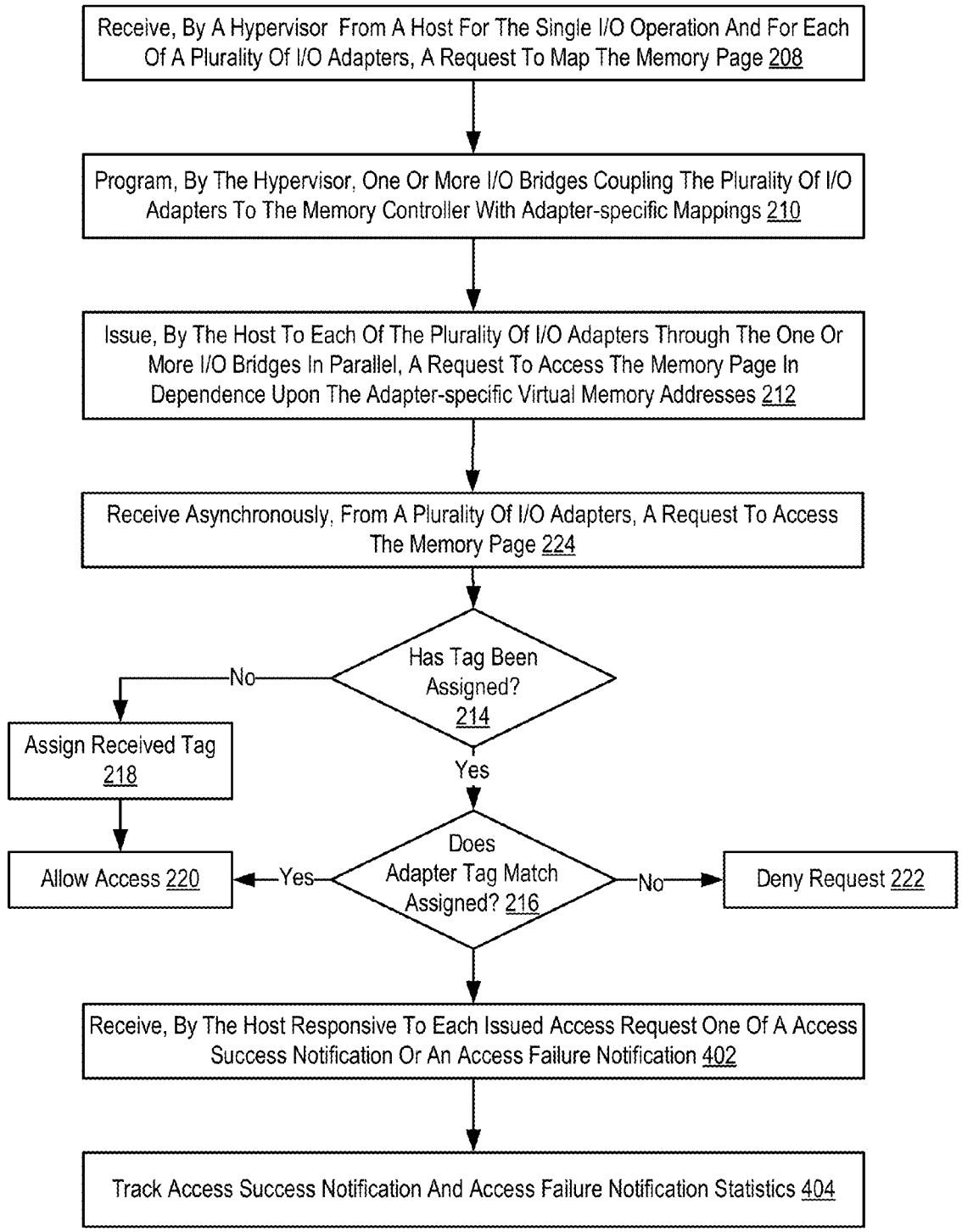
FIG. 4 sets forth a flow chart illustrating another example method for multipath I/O in a computer system according to embodiments of the present invention.

For further explanation, FIG. 4 sets forth a flow chart illustrating another example method for multipath I/O in a computer system according to embodiments of the present invention. The method of FIG. 4 is similar to the method of FIG. 2 in that the method of FIG. 4 may also be carried out in a computer system similar to that depicted in the example of FIG. 1. Further, the method of FIG. 4 also includes: receiving (208), for each of a plurality of I/O adapters, a request to map a memory page; programming (210) one or more I/O bridges with adapter-specific mappings; issuing (212) to each of the plurality of I/O adapters a request to access the memory page; receiving (224) asynchronously, from each I/O adapters, a request to access the memory page; for each request received by the memory controller: determining (214) whether an adapter-specific tag has been assigned to the memory page; if an adapter-specific tag has not been assigned to the memory page: assigning (218) the received adapter-specific tag to the memory page; and allowing (220) access to the memory page; and if an adapter-specific tag has been assigned to the memory page, granting access (220) to the memory page only when the received adapter-specific tag is the adapter-specific tag assigned to the memory page.

The method of FIG. 4 differs from the method of FIG. 2, however, in that the method of FIG. 4 also includes receiving (402), by the host responsive to each issued access request one of an access success notification or an access failure notification. In embodiments in which the access request issued by the host to the I/O adapters is an I/O operation, the adapter will report either a success or a failure after some period of time.

The method of FIG. 4 also includes tracking (404) access success notification and access failure notification statistics. Such statistics may provide insight into the health of each I/O adapter, the operational status of each I/O adapter, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for multipath I/O ('input/output'), the apparatus comprising a computer processor, a computer memory, a plurality of I/O adapters, and a memory controller, the memory controller configured to carry out:
   receiving asynchronously, for a single I/O operation from the plurality of I/O adapters, a request to access a memory page, where each request to access the memory page includes an adapter-specific tag; and
   for each request received by the memory controller:
   determining whether an adapter-specific tag has been assigned to the memory page;
   if an adapter-specific tag has not been assigned to the memory page:
      assigning, by the memory controller, the received adapter-specific tag to the memory page; and
      allowing, by the memory controller, access to the memory page; and
   if an adapter-specific tag has been assigned to the memory page, granting access to the memory page only when the received adapter-specific tag is the adapter-specific tag assigned to the memory page.

2. The apparatus of claim 1 further comprising a hypervisor, wherein the hypervisor is configured to carry out:
   initializing adapter-specific tag information of the memory page including clearing a tag assigned flag indicating whether an adapter-specific tag has been assigned to the memory page and clearing a value of an adapter-specific tag previously assigned to the memory page.

3. The apparatus of claim 2 wherein determining whether an adapter-specific tag has been assigned to the memory page further comprises determining whether the tag assigned flag is set.

4. The apparatus of claim 1 further comprising a hypervisor, wherein the hypervisor is configured to carry out:
   receiving, from a host for the single I/O operation and for each I/O adapter of the plurality of I/O adapters, a request to map the memory page, each request including an identifier of an I/O adapter, an adapter-specific virtual memory address, an address of the memory page, and an adapter-specific tag; and
   programming one or more I/O bridges coupling the plurality of I/O adapters to the memory controller with adapter-specific mappings, each adapter-specific mapping including an association of the memory page address, the adapter-specific tag, and the adapter-specific virtual memory address.

5. The apparatus of claim 4 wherein the host is configured to carry out:
   issuing, to each of the plurality of I/O adapters through the one or more I/O bridges in parallel, a request to access the memory page in dependence upon the adapter-specific virtual memory addresses.

6. The apparatus of claim 4, wherein the hypervisor is further configured to carry out:
   incrementing, for the single I/O operation, a counter, from an initial value, for each received request to map the memory page; and
   receiving asynchronously, by the hypervisor from the host for each I/O adapter of the plurality of I/O adapters, a request to unmap the memory page;
   decrementing, for each of the received unmap requests, the counter; and
   responsive to the decrementing the counter to the initial value, reinitializing a tag state of the memory page.

7. The apparatus of claim 1 wherein the host is configured to:
   receiving, responsive to each issued access request one of an access success notification or an access failure notification; and
   tracking access success notification and access failure notification statistics.

8. The apparatus of claim 1, wherein the memory controller is further configured to carry out:
   receiving, from a source, a request to access the memory page where the request does not include an adapter-specific tag and the memory page has been assigned an adapter-specific tag; and
   determining that source is authorized to access the memory page.

9. The apparatus of claim 1 further comprising a hypervisor, the hypervisor configured to carry out:
   initializing a tag state of the memory page including clearing a tag assigned flag and clearing a tag value of the memory page.

10. A computer program product for multipath I/O ('input/output') in a computer system, the computer program product disposed upon a computer readable medium, the computer program product comprising computer program instructions that, when executed, cause a computer to carry out:
   receiving asynchronously, for a single I/O operation from a plurality of I/O adapters, a request to access a memory page, where each request to access the memory page includes an adapter-specific tag; and for each request received by a memory controller:

determining whether an adapter-specific tag has been assigned to the memory page;

if an adapter-specific tag has not been assigned to the memory page:
assigning, by the memory controller, the received adapter-specific tag to the memory page; and
allowing, by the memory controller, access to the memory page; and if an adapter-specific tag has been assigned to the memory page, granting access to the memory page only when the received adapter-specific tag is the adapter-specific tag assigned to the memory page.

11. The computer program product of claim 10 further comprising computer program instructions that, when executed, cause a computer to carry out:

receiving, by a hypervisor from a host for the single I/O operation and for each I/O adapter of the plurality of PO adapters, a request to map the memory page, each request including an identifier of an I/O adapter, an adapter-specific virtual memory address, an address of the memory page, and an adapter-specific tag; and programming, by the hypervisor, one or more I/O bridges coupling the plurality of I/O adapters to the memory controller with adapter-specific mappings, each adapter-specific mapping including an association of the memory page address, the adapter-specific tag, and the adapter-specific virtual memory address.

* * * * *